(12) United States Patent
Dynes et al.

(10) Patent No.: US 11,400,912 B2
(45) Date of Patent: Aug. 2, 2022

(54) COASTING MANAGEMENT CONTROL OF A VEHICLE WITH A ROAD SPEED GOVERNOR

(71) Applicant: Cummins Inc., Columbus, IN (US)

(72) Inventors: Joseph R. Dynes, Columbus, IN (US); Nathanael G. Long, Avon, IN (US)

(73) Assignee: Cummins Inc., Columbus, IN (US)

(*) Notice: Subject to any disclaimer, the term of this patent is extended or adjusted under 35 U.S.C. 154(b) by 240 days.

(21) Appl. No.: 16/748,447

(22) Filed: Jan. 21, 2020

(65) Prior Publication Data

US 2020/0156616 A1 May 21, 2020

Related U.S. Application Data

(63) Continuation of application No. PCT/US2018/043383, filed on Jul. 24, 2018.
(Continued)

(51) Int. Cl.
*B60W 10/02* (2006.01)
*B60W 30/18* (2012.01)
(Continued)

(52) U.S. Cl.
CPC ...... *B60W 10/02* (2013.01); *B60W 30/18072* (2013.01); *B60W 40/12* (2013.01); *B60W 40/107* (2013.01); *B60W 2030/1809* (2013.01)

(58) Field of Classification Search
CPC ........... B60W 10/02; B60W 30/18072; B60W 40/12; B60W 40/107; B60W 2030/1809
See application file for complete search history.

(56) References Cited

U.S. PATENT DOCUMENTS

| 4,905,785 A | 3/1990 | Kieffer et al. |
| 5,393,277 A | 2/1995 | White et al. |

(Continued)

FOREIGN PATENT DOCUMENTS

| EP | 0025025 A2 | 3/1981 | |
| WO | 2017075578 A1 | 5/2017 | |
| WO | WO-2017075578 A1 * | 5/2017 | ............... B60T 7/22 |

OTHER PUBLICATIONS

International Search Report; International Searching Authority; International Application No. PCT/US2018/043383; dated Oct. 12, 2018; 2 pages.
(Continued)

*Primary Examiner* — Anne Marie Antonucci
*Assistant Examiner* — Jingli Wang
(74) *Attorney, Agent, or Firm* — Taft Stettinius & Hollister LLP

(57) ABSTRACT

A system, method, and apparatus includes management of coasting during operation of a vehicle having an engine that is selectively engageable to a driveline, a cruise control mode of operation, and a road speed governor mode of operation. A road speed governor mode of operation of the vehicle is active in response to a road speed governor operation condition being present wherein the driveline is engaged with the engine. When a coasting management condition is present, operation of the vehicle in the road speed governor mode is disabled, the driveline is disengaged from the engine, and the vehicle is operated in a coasting mode of operation. The coasting mode of operation can be canceled when a coasting mode of operation cancellation condition is present to operate the vehicle in a road speed governor mode of operation with the driveline re-engaged with the engine.

37 Claims, 4 Drawing Sheets

Related U.S. Application Data

(60) Provisional application No. 62/536,195, filed on Jul. 24, 2017.

(51) Int. Cl.
*B60W 40/12* (2012.01)
*B60W 40/107* (2012.01)

(56) References Cited

U.S. PATENT DOCUMENTS

| | | |
|---|---|---|
| RE36,186 E | 4/1999 | White et al. |
| 7,134,355 B2 | 11/2006 | Eriksson et al. |
| 2012/0220424 A1 | 8/2012 | Staudinger et al. |
| 2013/0296119 A1 | 11/2013 | Reed et al. |
| 2017/0137029 A1 | 5/2017 | Dynes et al. |
| 2017/0137030 A1* | 5/2017 | Fujita .................... F02D 11/02 |

OTHER PUBLICATIONS

Written Opinion of the International Searching Authority; International Searching Authority; International Application No. PCT/US2018/043383; dated Oct. 12, 2018; 13 pages.

International Preliminary Report on Patentability; International Searching Authority; International Application No. PCT/US2018/043383; dated Jan. 28, 2020; 14 pages.

* cited by examiner

COASTING MANAGEMENT CONTROL OF A VEHICLE WITH A ROAD SPEED GOVERNOR

CROSS-REFERENCE TO RELATED APPLICATION

The present application is a continuation of International Patent Application No. PCT/US18/43383 filed on Jul. 24, 2018, claims the benefit of the filing date of U.S. Provisional Application No. 62/536,195 filed on Jul. 24, 2017, which is incorporated herein by reference.

TECHNICAL FIELD

The present application relates generally to management of coasting operation of a vehicle for fuel economy improvements, and more particularly to coasting management of a vehicle that includes a road speed governor.

BACKGROUND

Coasting management of vehicles utilizes vehicle momentum in certain situations to improve fuel economy of the vehicle during certain operating conditions by disengaging the driveline from the engine. Coasting of the vehicle can be beneficial for other operational aspects and/or components of the vehicle as well. Vehicles with coasting management systems utilize the coasting mode of operation when operating conditions indicate low or no accelerator input such as during cruise control operations. While vehicle coasting during such conditions provides fuel economy benefits, utilization of vehicle coasting during other operating conditions can provide additional benefits. Therefore, there remains a significant need for the apparatuses, methods and systems disclosed herein.

SUMMARY

In one embodiment, an apparatus comprising an electronic control unit for a vehicle including an engine that is selectively engageable to a driveline, wherein the electronic control unit is configured to: determine a road speed governor mode of operation of the vehicle being active in response to one or more road speed governor operation conditions being present; disable operation of the vehicle in the road speed governor mode in response to one or more coasting management conditions being present; and operate the vehicle in a coasting mode of operation with the driveline disengaged from the engine.

In some embodiments, the road speed governor operation conditions include a speed of the vehicle being greater than a vehicle threshold speed and an accelerator pedal position of the vehicle being greater than a threshold accelerator pedal position.

In some embodiments, the electronic control unit is configured to determine an accelerator pedal position of the vehicle being less than a second threshold accelerator pedal position, and to re-engage the driveline to the engine in response to the accelerator pedal being re-engaged to more than the second accelerator pedal threshold.

In some embodiments, the electronic control unit is configured to disable operation of the vehicle in the coasting mode of operation in response to one or more coasting mode of operation cancellation conditions and to re-engage the driveline with the engine. In a further refinement, the electronic control unit is configured to after the disable operation of the vehicle in the coasting mode of operation, to re-enable operation of the vehicle in the road speed governor mode and re-engaging the driveline with the engine. In another refinement, the one or more coasting mode of operation cancellation conditions include an engine brake being activated and the accelerator pedal position being less than a road speed governor activation accelerator pedal position.

In some embodiments, the electronic control unit is configured to determine a torque output of the engine is less than an activation threshold to operate the vehicle in the coasting mode of operation.

In another embodiment, an apparatus comprising an electronic control unit for a vehicle including an engine that is selectively engageable to a driveline, wherein the electronic control unit is configured to monitor a speed of the vehicle and an accelerator pedal position of the vehicle; determine a road speed governor mode of operation being active in response to the vehicle speed being greater than a vehicle threshold speed and the accelerator pedal position being greater than a threshold accelerator pedal position; and override the road speed governor mode of operation and operate the vehicle in a coasting mode of operation with the driveline disengaged from the engine in response to one or more coasting management conditions being present.

In some embodiments, the electronic control unit is configured to determine a cruise control mode of operation of the vehicle being disabled before the coasting mode of operation is initiated.

In some embodiments, the electronic control unit is configured to in response to the vehicle speed being less than a first threshold vehicle speed by more than a cancel delta amount while in the coasting mode of operation, operate the vehicle with the driveline re-engaged to the engine and the coasting mode of operation disabled. In one refinement, the first threshold speed is a coasting management condition and the cancel delta corresponds to a second threshold speed that is less than the first threshold speed.

In some embodiments, the electronic control unit is configured to determine a torque output of the engine is less than an activation threshold to operate the vehicle in the coasting mode of operation.

In some embodiments, the electronic control unit is configured to determine an accelerator pedal position is less than a second threshold accelerator pedal position, and re-engaging the driveline to the engine in response to the accelerator pedal being re-engaged to more than the second accelerator pedal threshold.

In some embodiments, the electronic control unit includes a road speed governor control module configured to control the driveline disengagement for the coasting mode of operation.

In one embodiment, an apparatus comprising an electronic control unit for a vehicle including an engine that is selectively engageable to a driveline, wherein the electronic control unit is configured to: operate the vehicle in a coasting mode of operation with the driveline disengaged from the engine in response to one or more coasting management conditions being present; and override the coasting mode of operation and operating the vehicle in a road speed governor mode of operation with the driveline re-engaged with the engine in response to one or more coasting mode of operation cancellation conditions being present.

In some embodiments, the one or more coasting mode of operation cancellation conditions includes a speed of the vehicle being less than a first threshold vehicle speed and an accelerator pedal position being greater than a threshold accelerator pedal position.

In some embodiments, the one or more coasting mode of operation cancellation conditions includes the vehicle speed being less than the first threshold vehicle speed by more than a cancel delta amount.

In some embodiments, the one or more coasting management conditions includes a speed of the vehicle being greater than a threshold vehicle speed.

In one embodiment, a method includes operating a vehicle including an engine that is selectively engageable to a driveline, monitoring a speed of the vehicle and an accelerator pedal position of the vehicle, and the road speed governor mode of operation being active in response to the vehicle speed being greater than a vehicle threshold speed and the accelerator pedal position being greater than a threshold accelerator pedal position, and overriding the road speed governor mode of operation and operating the vehicle in a coasting mode of operation with the driveline disengaged from the engine.

In some embodiments, a cruise control mode of operation of the vehicle being disabled is required before the coasting mode of operation is initiated. In some embodiments, a torque output of the engine is determined to be less than an activation threshold to to operate the vehicle in the coasting mode of operation.

In certain embodiments, in response to the vehicle speed being less than a first vehicle speed threshold by more than a cancel delta speed amount while in the coasting mode of operation, the coasting mode of operation is terminated and the driveline is re-engaged with the engine. In some embodiments, the cancel delta speed amount establishes a second vehicle speed threshold for driveline re-engagement that is less than the first vehicle speed threshold at which the coasting mode of operation is initiated.

In some embodiments, the coasting mode of operation is terminated in response to the accelerator pedal position being less than a second threshold, where the second threshold is less than the threshold accelerator pedal position, and then accelerator pedal position being re-engaged and position more than the second threshold.

In certain embodiments, the threshold accelerator position is at least 75% of a fully depressed accelerator pedal position for a road speed governor mode of operation.

In one embodiment, a method includes operating a vehicle including an engine that is selectively engageable to a driveline; determining a road speed governor mode of operation of the vehicle being active in response to one or more road speed governor operation conditions being present; disabling operation of the vehicle in the road speed governor mode in response to one or more coasting management conditions being present; and operating the vehicle in a coasting mode of operation with the driveline disengaged from the engine.

In some embodiments, the road speed governor operation conditions include a speed of the vehicle being greater than a vehicle threshold speed and an accelerator pedal position of the vehicle being greater than a threshold accelerator pedal position.

In some embodiments, determining an accelerator pedal position of the vehicle is less than a second threshold accelerator pedal position, and re-engaging the driveline to the engine in response to the accelerator pedal being re-engaged to more than the second accelerator pedal threshold.

In certain embodiments, disabling operation of the vehicle in the coasting mode of operation in response to one or more coasting mode of operation cancellation conditions and re-engaging the driveline with the engine.

In some embodiments, after disabling operation of the vehicle in the coasting mode of operation, re-enabling operation of the vehicle in the road speed governor mode and re-engaging the driveline with the engine.

In certain embodiments, the one or more coasting mode of operation cancellation conditions include an engine brake being activated and the accelerator pedal position being less than a road speed governor activation accelerator pedal position.

In some embodiments, determining a torque output of the engine is less than an activation threshold to operate the vehicle in the coasting mode of operation.

In one embodiment, a method includes operating a vehicle including an engine that is selectively engageable to a driveline; operating the vehicle in a coasting mode of operation with the driveline disengaged from the engine in response to one or more coasting management conditions being present; and overriding the coasting mode of operation and operating the vehicle in a road speed governor mode of operation with the driveline re-engaged with the engine in response to one or more coasting mode of operation cancellation conditions being present.

In certain embodiments, the one or more coasting mode of operation cancellation conditions includes a speed of the vehicle being less than a first threshold vehicle speed and an accelerator pedal position being greater than a threshold accelerator pedal position.

In some embodiments, the one or more coasting mode of operation cancellation conditions includes the vehicle speed being less than the first threshold vehicle speed by more than a cancel delta amount.

In some embodiments, the one or more coasting management conditions includes a speed of the vehicle being greater than a threshold vehicle speed.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
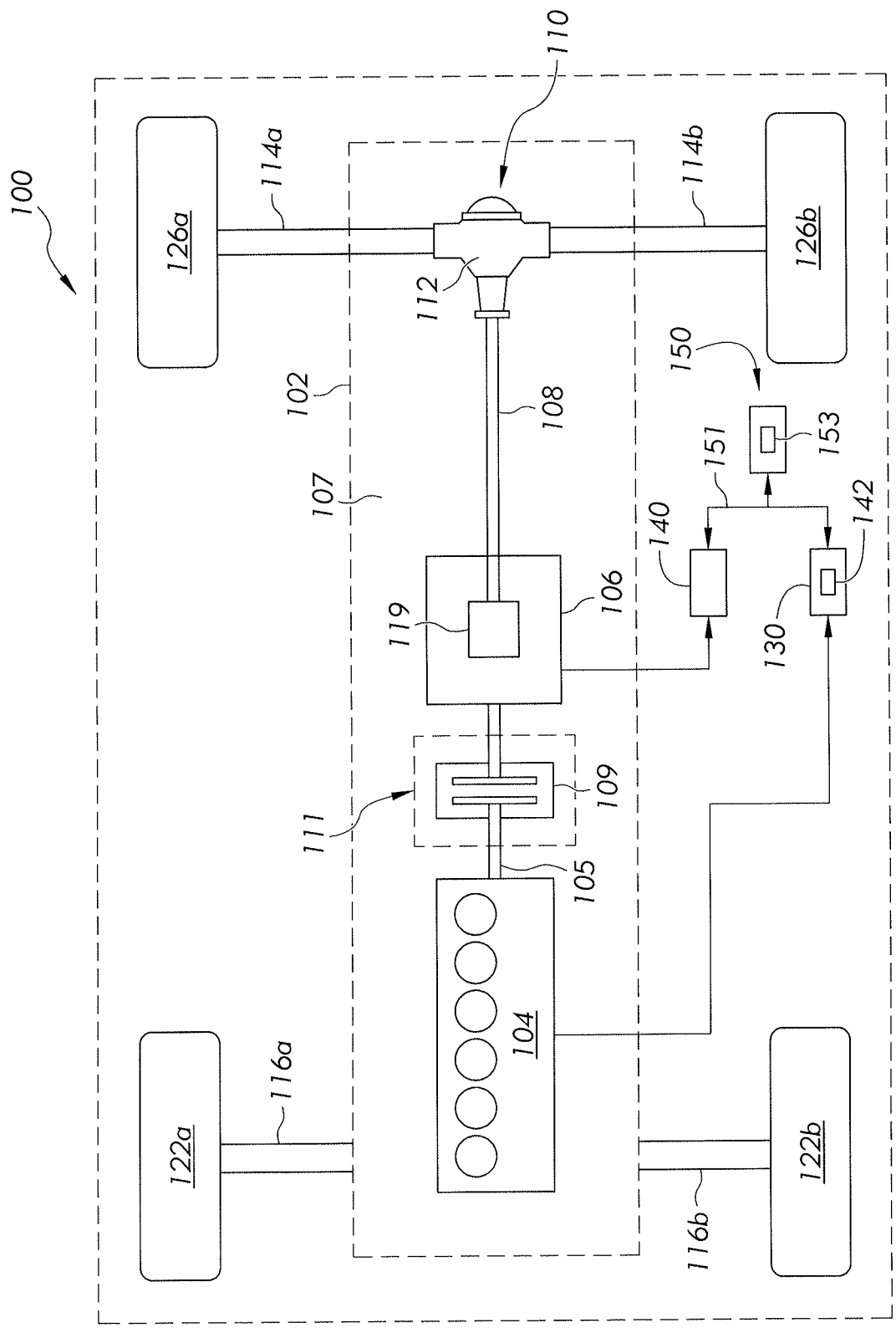
FIG. 1 is a schematic illustration of a vehicle with a road speed governor system and a coasting management system for speed control and coasting management of the vehicle.

With reference to FIG. 1, there is illustrated a schematic view of an exemplary vehicle 100 including a powertrain 102 incorporated within vehicle 100. In the illustrated embodiment, the powertrain 102 includes an engine 104, such as an internal combustion engine, structured to generate power for the vehicle 100. The powertrain 102 further includes a transmission 106 connected to the engine 104 for adapting the output torque of the engine 104 and transmitting the output torque to a driveline 107 including drive shaft 108. In the illustrated embodiment, the transmission 106 is a manual transmission that may be disengageably connected to an engine crankshaft 105 via a clutch 109. Other embodiments contemplate a transmission 106 that is an automatic transmission, an automated manual transmission, or any other suitable transmission with a disconnect device 111 that is operable to selectively engage and disengage engine 104 from driveline 107.

In the rear wheel drive configuration illustrated for vehicle 100, the driveline 107 of powertrain 102 includes a final drive 110 having a rear differential 112 connecting the drive shaft 108 to rear axles 114a, 114b. It is contemplated that the components of powertrain 102 may be positioned in different locations throughout the vehicle 100. In one non-limiting example of a vehicle 100 having a front wheel drive configuration, transmission 106 may be a trans axle and final drive 110 may reside at the front of the vehicle 100, connecting front axles 116a and 116b to the engine 104 via the transaxle. It is also contemplated that in some embodiments the vehicle 100 is in an all-wheel drive configuration.

In the illustrated embodiment, vehicle 100 includes two front wheels 122a, 122b mounted to front axles 116a, 116b, respectively. Vehicle system 100 further includes two rear wheels 126a, 126b mounted to rear axles 114a, 114b, respectively. It is contemplated that vehicle 100 may have more or fewer wheels than illustrated in FIG. 1. Vehicle 100 may also include various components not shown, such as a fuel system including a fuel tank, a front differential, a braking system, a suspension, an engine intake system and an exhaust system, which may include an exhaust aftertreatment system, just to name a few examples.

Vehicle 100 includes an electronic or engine control unit (ECU) 130, sometimes referred to as an electronic or engine control module (ECM), or the like, which is directed to regulating and controlling the operation of engine 104. A transmission control unit (TCU) 140 is illustrated in vehicle 100, which is directed to the regulation and control of transmission 106 operation. ECU 130 and TCU 140 are each in electrical communication with a plurality of vehicle sensors (not shown) in vehicle 100 for receiving and transmitting operating conditions of vehicle 100, such as temperature conditions, pressure conditions, speed conditions, accelerator pedal conditions, fuel conditions, flow conditions to and from the engine, terrain conditions, weather conditions, global positioning system (GPS) data, and vehicle mass, for example. It is contemplated that ECU 130 and TCU 140 may be integrated within the engine 104 and transmission 106, respectively.

In certain embodiments, the ECU 130 may be combined into a single control module with a cruise control (CC) module 142. CC module 142 can also be provided with any other module or as a stand-alone module. Other various electronic control units for vehicle subsystems are typically present in vehicle system 100, such as a braking system electronic control unit and a cruise control electronic control unit, for example, but such other various electronic control units are not shown in vehicle 100 to preserve clarity.

Vehicle system 100 further includes a road speed governor (RSG) controller or control module 150, which may be directed to the control of the operations described herein and/or directed toward an intermediary control for the regulation and control of the powertrain 102 in vehicle system 100. In the illustrated embodiment, RSG control module 150 includes an arbitration module 153, although arbitration module 153 can be provided in any of the other modules or as a stand-alone module. In the illustrated embodiment, RSG control module 150 is in electrical communication with each of the ECU 130 and TCU 140. In certain embodiments, at least a portion of the RSG control module 150 may also be integrated within the ECU 130. In still other embodiments, the RSG control module 150 may be combined with the TCU 140 into a single control module. In the illustrated embodiment, at least RSG control module 150 communicates with ECU 130 and/or TCU 140 over a datalink 151 provided by a wired or wireless connection so that outputs of RSG control module 150 that are determined independently of TCU 140 and/or ECU 130 can be provided to TCU 140 and/or ECU 130.

RSG control module 150 may further be in electrical communication with one or more of the plurality of vehicle sensors in vehicle 100 for receiving and transmitting conditions of vehicle 100, such as temperature and pressure conditions, route conditions, terrain conditions, speed conditions, accelerator pedal position, torque output of the engine, and weather conditions, for example. It is contemplated that at least a portion of the conditions and/or measured inputs used for interpreting signals by the RSG control module 150 may be received from ECU 130 and/or TCU 140 and/or CC module 142, in addition to or alternatively to the plurality of vehicle sensors. Furthermore, the RSG control module 150 may include a processor or controller and/or could be a control module. In the illustrated embodiment, RSG control module 150 includes an arbitration module 153 configured to evaluate one or more operating parameters and arbitrate between a road speed governor mode of operation, a coasting mode of operation, and a re-engagement of the driveline to the engine during the coasting mode of operation. However, an arbitration module 153 is not required and arbitration decisions can be made with RSG control module 150 or other controller discussed herein.

The RSG control module 150, ECU 130, TCU 140 and/or any other module disclosed herein includes stored data values, constants, and functions, as well as operating instructions stored on, for example, a computer readable medium. Any of the operations of exemplary procedures described herein may be performed at least partially by the RSG control module 150, ECU 130, and/or TCU 140. In certain embodiments, the RSG control module 150, ECU 130, and/or TCU 140 includes one or more modules structured to functionally execute the operations on the controller. In alternative embodiments, the RSG control module 150, ECU 130, and/or TCU 140 includes one or more controllers. The description herein including modules emphasizes the structural independence of the aspects of the RSG control module 150, ECU 130, and/or TCU 140 and illustrates one grouping of operations and responsibilities of the RSG control module 150. Other groupings that execute similar overall operations are understood within the scope of the present application. Modules may be implemented in hardware and/or instructions on computer readable medium, and modules may be distributed across various hardware or computer readable medium components. More specific descriptions of certain embodiments of controller operations are discussed below. Operations illustrated are understood to be exemplary only, and operations may be combined or divided, and added or removed, as well as re-ordered in whole or part, unless stated explicitly to the contrary herein.

Certain operations described herein include operations to interpret or determine one or more parameters. Interpreting or determining, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

One exemplary embodiment of CC module 142 is configured to control the vehicle speed while the vehicle is in a cruise control mode of operation. An exemplary embodiment of the RSG control module 150 is configured to provide a road speed governor mode of operation to limit the maximum allowable vehicle speed of the vehicle while the vehicle is not in a cruise control mode of operation in response to road speed governor operation conditions being present. In one embodiment, the RSG control module 150 can also receive and interpret one or more of engine power or torque output, upcoming terrain data, accelerator pedal position, vehicle speed, and other inputs to optimize the vehicle speed profile to improve fuel economy while in a road speed governor mode of operation. Any road speed governor control operating methodology is contemplated herein where the RSG control module 150 limits the maximum vehicle speed in response to one or more inputs to the RSG control module 150.

Figure 2:
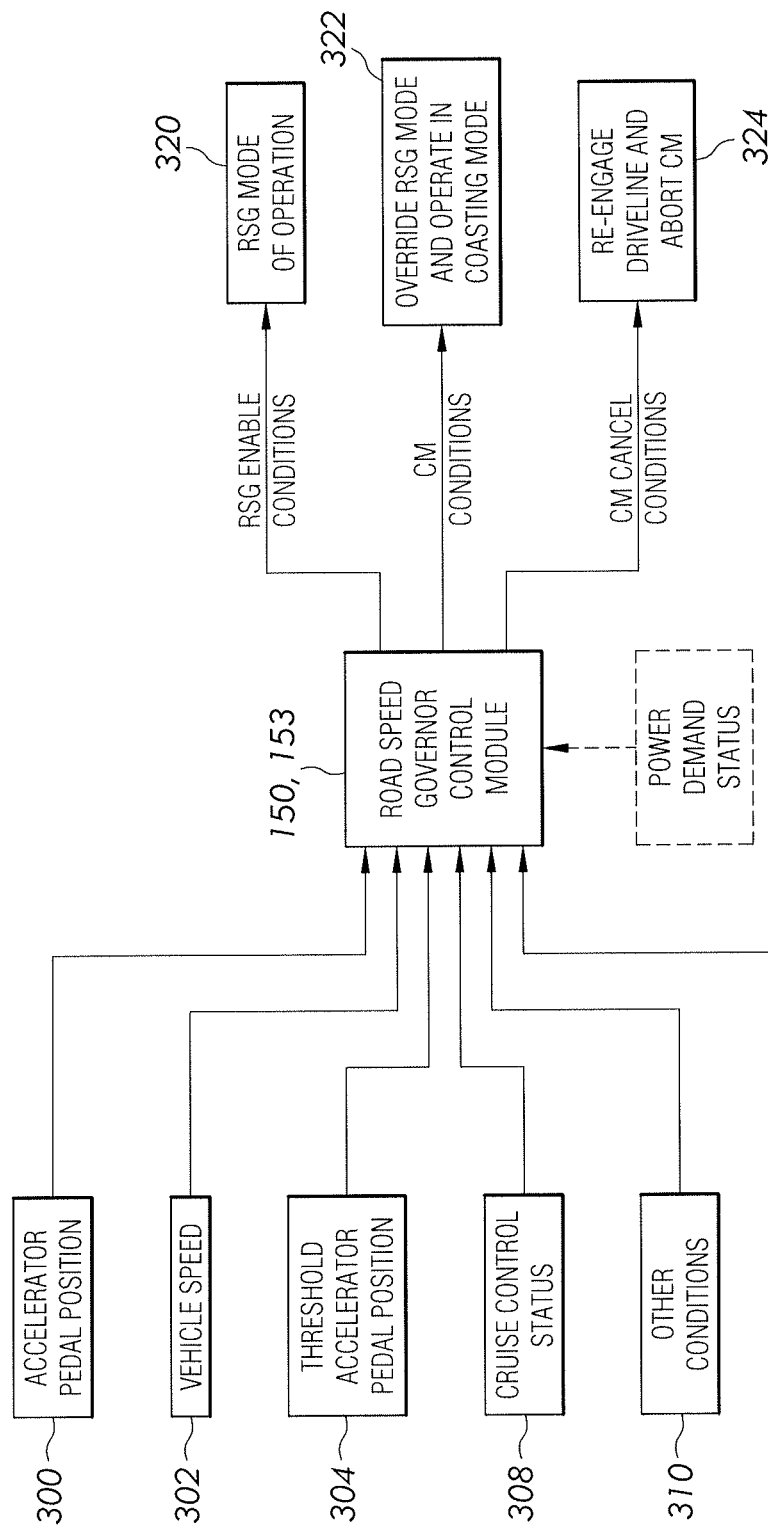
FIG. 2 is a schematic illustration of inputs required for a vehicle equipped with a road speed governor system and a coasting management system.

As illustrated in FIG. 2, one exemplary embodiment of RSG control module 150 receives inputs such as an accelerator pedal position 300 and a vehicle speed 302 while the vehicle is being operated or under current driving conditions. The accelerator pedal position 300 is the operator selected accelerator pedal position and the vehicle speed 302 is the operator selected vehicle speed. In this exemplary embodiment, a threshold accelerator pedal position 304 and a threshold vehicle speed 306 are stored in a memory of or communicated to the RSG control module 150 for comparison to the accelerator pedal position 300 and the vehicle speed 302, respectively. The threshold accelerator pedal position 304 is the accelerator pedal position enables condition that is set by the operator of the vehicle to determine if the vehicle can be operated under a road speed governor mode of operation where the actual vehicle speed is limited automatically by RSG control module 150. The threshold vehicle speed 306 is the speed enable condition that, along with the accelerator pedal position, determines if the vehicle is to be operated under the road speed governor mode of operation. If the accelerator pedal position 300 is greater than the threshold accelerator pedal position 304 and if the vehicle speed 302 is greater than the threshold vehicle speed 306 then the vehicle can be operated under a road speed governor mode of operation.

The RSG control module 150 may also receive a cruise control status 308 and other conditions 310 relevant to the vehicle being operated under current driving conditions. The cruise control status 308 is either engaged/active or disengaged/deactivated by the operator to determine if the vehicle is to be operated under a cruise control mode of operation. In certain embodiments, the road speed governor mode of operation is disabled in response to the cruise control mode of operation being engaged or active. The other conditions 310 that may also be considered in order to enable a coasting mode of operation include inputs such as the service brake being undepressed. The other conditions 310 for enablement of coasting mode of operation may also include vehicle system or environmental conditions such as inactive yaw/roll/slip control, timer conditions, no regen/thermal management active, no transmission shift in progress, the absence of certain datalink messages indicating another device (other than accelerator pedal) is controlling the engine torque, the engine being able to meet sync speed at current vehicle speed, and the road grade being within thresholds, to name a few example conditions.

As illustrated in FIG. 2, in one embodiment, the arbitration module 153 and/or the RSG control module 150 are configured to determine road speed governor enable conditions are present or absent, and control engine 104 to operate in a road speed governor mode of operation 320 when enablement conditions are satisfied. The arbitration module 153 and/or the RSG control module 150 are further configured to determine coasting management enablement conditions are present and to override the road speed governor mode operation 320 by disengaging the driveline 107 from the engine 104 and operate in a coasting mode of operation 322. The arbitration module 153 and/or the RSG control module 150 are further configured to determine cancellation conditions are present to cancel or terminate the coasting mode of operation 322 and re-engage the driveline and engine at re-engagement mode of operation 324. The re-engagement mode of operation 324 can be a resumption of the road speed governor mode of operation 320 if RSG enable conditions are satisfied, or to resume operator control over the vehicle speed via the accelerator pedal with the RSG control deactivated.

In one embodiment, the arbitration module 153 and/or the RSG control module 150 is configured to provide a command in response to coasting management conditions for the vehicle being present that includes disconnecting or disengaging the engine 104 from the driveline 107 to override the road speed governor mode of operation 320 and operate in a coasting mode of operation 322 when route conditions are favorable to do so in order to, for example, reduce fuel consumption. The driveline disengagement decouples engine 104 from driveline 107 and therefore reduces engine drag and increases vehicle momentum, which postpones the return to high fuel burn conditions. The determination of favorable route conditions for coasting can be enhanced with look-ahead route data. In certain embodiments, the coasting mode of operation is entered to override the road speed governor mode of operation regardless of engine brake switch position. Another operating condition for coasting mode of operation is the torque output from the engine being less than an activation threshold. The arbitration module 153 and/or the RSG control module 150 can be configured to provide a command to reconnect or re-engage the engine 104 with the driveline 107 to operate the vehicle in a road speed governor mode of operation 320 or under operator control in response to one or more coasting mode of operation cancellation conditions, thereby cancelling the coasting mode of operation 322.

Figure 5:
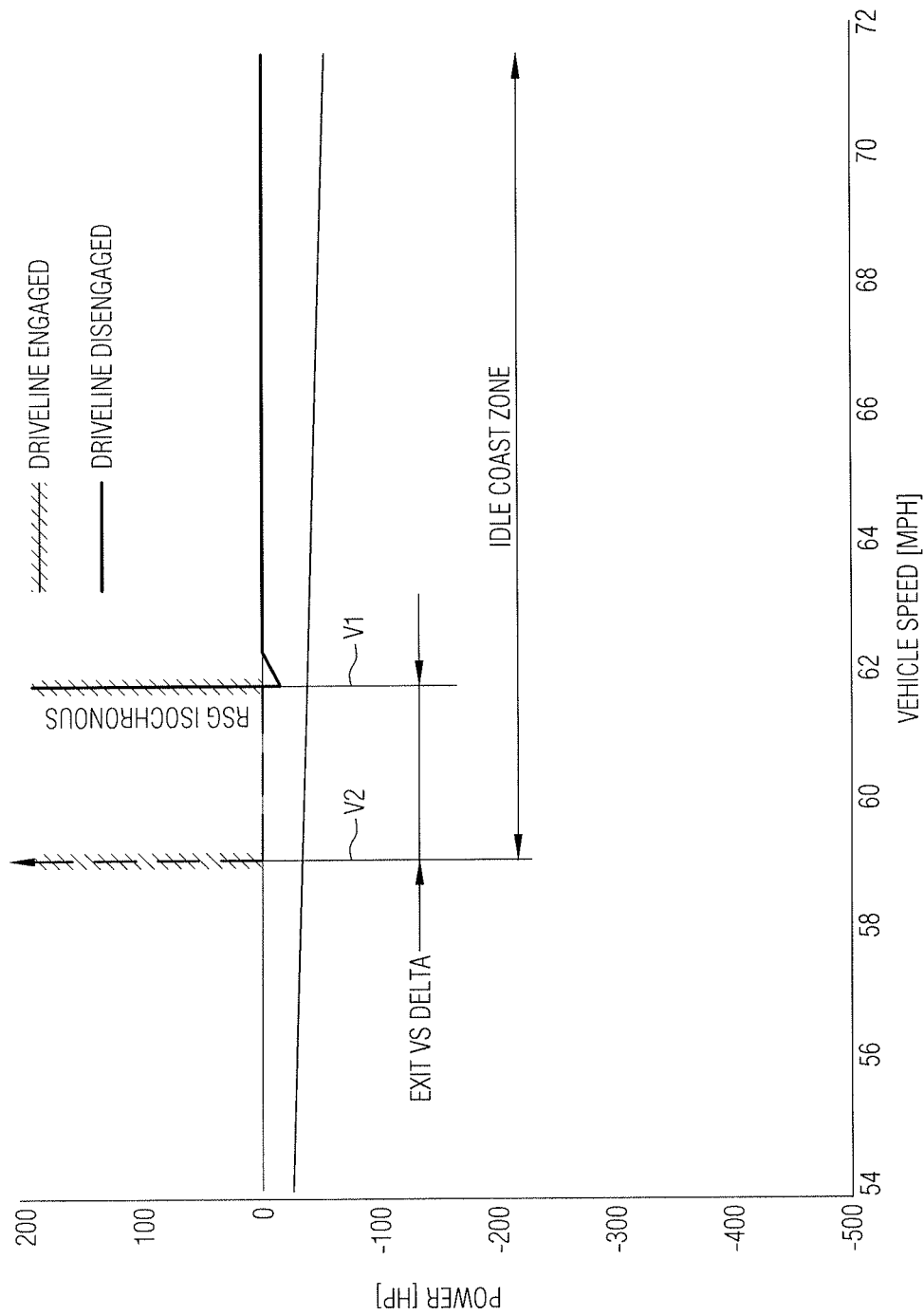
FIG. 5 is a graph illustrating driveline engagement/disengagement of the vehicle relative to vehicle speed and power output of the engine.

In certain embodiments, the coasting mode of operation cancellation conditions include the accelerator pedal position being pressed more than a threshold amount indicating road speed governor mode of operation is enabled, along with the vehicle speed falling below a second threshold amount that is a cancel delta speed less than the coasting mode of operation activation threshold speed (see FIG. 5). In another embodiment, the coasting cancellation condition includes an engine brake switch being on and the accelerator pedal is released below the RSG activation accelerator pedal threshold amount or accelerator pedal position. In another embodiment, the operator releases the accelerator pedal completely and the engine brake switch is off, but the coasting mode of operation continues until one or more other cancellations conditions is satisfied, such as dropping below a speed threshold or the accelerator pedal being released below the accelerator pedal threshold amount then subsequently increased above the threshold amount. In another embodiment, the vehicle remains in the coasting mode of operation if the operator releases the accelerator pedal to an intermediate position and the acceleration demand is low. If the vehicle slows with the accelerator pedal at this intermediate position, such that acceleration demand increases, then the coasting mode of operation is cancelled or aborted at a predefined threshold speed, torque, etc.

Figure 3:
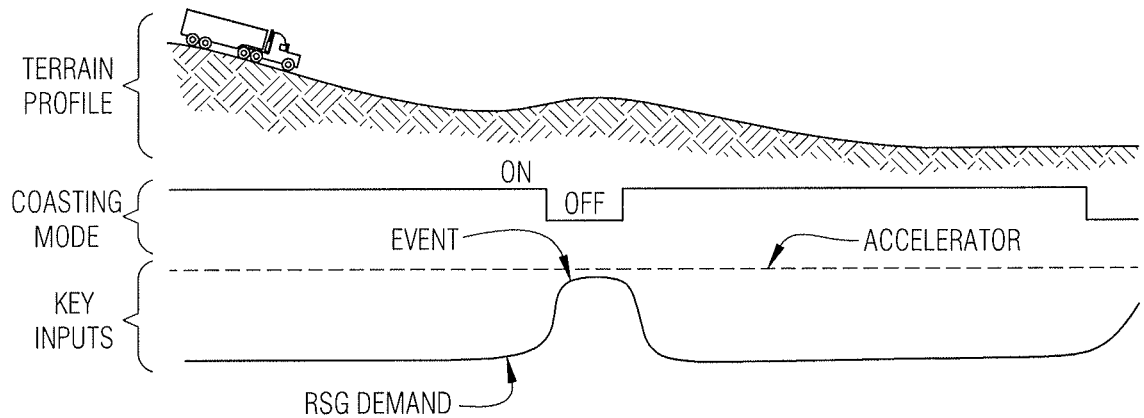
FIG. 3 is one embodiment of a graph illustrating an exit from and re-entry to a road speed limited coasting event.

As illustrated in FIG. 3, in one embodiment of operation of vehicle 100, a terrain profile or vehicle route is determined which may include the conditions of the route for a certain distance or period in front of the vehicle along the route. The road speed governor mode of operation is enabled as indicated by the accelerator pedal position 300 being greater than the threshold accelerator pedal position 304, and the vehicle speed 302 being greater than the threshold vehicle speed 306. The RSG control module 150 overrides the road speed governor mode of operation (RSG demand) and disengages the drive line from the engine to provide a coasting mode of operation. In response to a coasting mode of operation cancellation event, e.g., a hill or some other route condition or operating condition such as vehicle speed dropping below a threshold, the coasting mode of operation is turned off and the driveline of the vehicle is re-engaged to the engine and vehicle operation occurs in the road speed governor mode of operation to achieve a speed target according to the road speed governor settings. Once the coasting management enablement conditions are satisfied again, the driveline is disengaged from the engine and the road speed governor mode of operation is overridden again.

Figure 4:
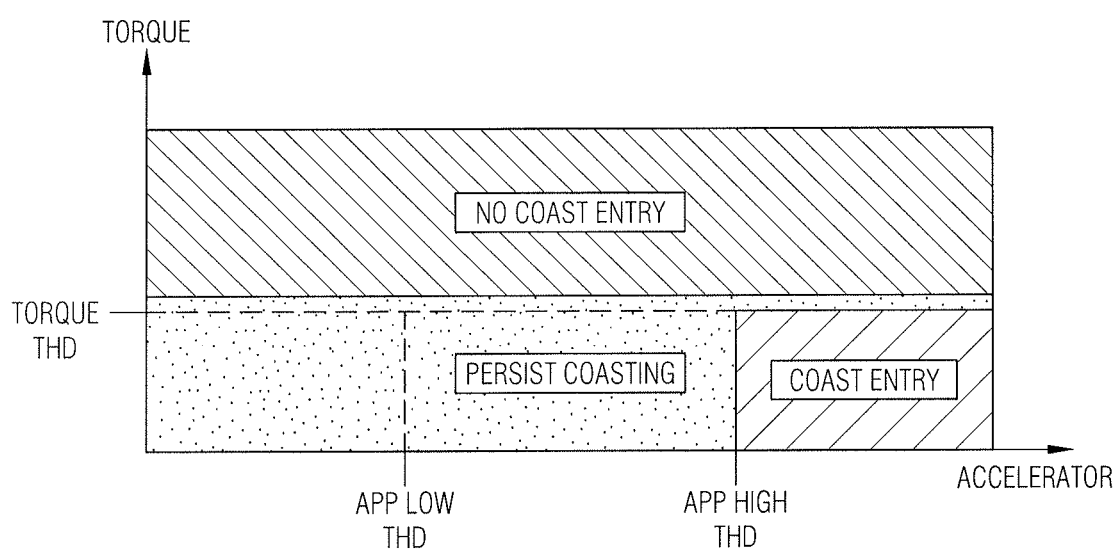
FIG. 4 is a graph illustrating coasting conditions relative to torque output and accelerator pedal position of the vehicle.

Illustrated in FIG. 4, is a chart depicting torque output of an engine relative to the accelerator pedal position to indicate possible operating conditions in which the coasting mode of operation of the vehicle is available. For example, at low accelerator pedal positions and low torque outputs, the vehicle can operate in a coasting management mode above certain speed thresholds, such as when the cruise control is active. Furthermore, the present invention allows a coasting mode of operations to occur and override road speed governor operations that typically occur at high accelerator pedal positions with the torque output of the engine being less than an activation threshold.

Illustrated in FIG. 5, when the road speed governor mode operation is active, the coasting mode of operation is disabled below a certain vehicle speed threshold V1. During the road speed governor mode of operation, the driveline is engaged with engine and the vehicle speed is limited to a maximum speed. When the vehicle speed exceeds threshold vehicle speed V1, the coasting mode of operation is enabled and the driveline can be disengaged from the engine to allow coasting and override of the road speed governor mode of operation. When coasting management conditions are not present, such as the vehicle speed dropping below threshold vehicle speed V2, the driveline can be re-engaged to the engine to resume the road speed governor mode of operation or control of the vehicle by the operator via the accelerator pedal.

Various aspects of the present disclosure are contemplated as described in the claims. According to one aspect, a method includes operating a vehicle including an engine that is selectively engageable to a driveline; monitoring a speed of the vehicle and an accelerator pedal position of the vehicle; and determining a road speed governor mode of operation being active in response to the vehicle speed being greater than a vehicle threshold speed and the accelerator pedal position being greater than a threshold accelerator pedal position, and overriding the road speed governor mode of operation and operating the vehicle in a coasting mode of operation with the driveline disengaged from the engine in response to one or more coasting management conditions being present.

Certain embodiments of the method include any one or combination of the following: a coasting management enablement conditioning including a cruise control of the vehicle being disabled; in response to the vehicle speed being less than a first threshold speed by more than a cancel delta amount while in the coasting mode of operation, operating the vehicle with the driveline re-engaged to the engine and the coasting mode of operation disabled; the cancel delta corresponding to a second speed threshold that is less than the first speed threshold; determining a torque output of the engine is less than an activation threshold to operate the vehicle in the coasting mode of operation; determining the accelerator pedal position is less than a second threshold accelerator pedal position, and re-engaging the driveline to the engine in response to the accelerator pedal being re-engaged so the accelerator pedal position is more than the second accelerator threshold position; the threshold accelerator position is at least 75% of a fully depressed accelerator pedal position; and the driveline disengagement for the coasting mode of operation is controlled with a road speed governor control module.

According to one aspect a method includes operating a vehicle including an engine that is selectively engageable to a driveline; determining a road speed governor mode of operation of the vehicle being active in response to one or more road speed governor operation conditions being present; disabling operation of the vehicle in the road speed governor mode in response to one or more coasting management conditions being present; and operating the vehicle in a coasting mode of operation with the driveline disengaged from the engine.

Certain embodiments of the method include any one or combination of the following: the road speed governor operation conditions include a speed of the vehicle being greater than a vehicle threshold speed and an accelerator pedal position of the vehicle being greater than a threshold accelerator pedal position; determining an accelerator pedal position of the vehicle is less than a second threshold accelerator pedal position, and re-engaging the driveline to the engine in response to the accelerator pedal being re-engaged to more than the second accelerator pedal threshold; disabling operation of the vehicle in the coasting mode of operation in response to one or more coasting mode of operation cancellation conditions and re-engaging the driveline with the engine; after disabling operation of the vehicle in the coasting mode of operation, re-enabling operation of the vehicle in the road speed governor mode and re-engaging the driveline with the engine; the one or more coasting mode of operation cancellation conditions include an engine brake being activated and the accelerator pedal position being less than a road speed governor activation accelerator pedal position; determining a torque output of the engine is less than an activation threshold to operate the vehicle in the coasting mode of operation.

According to one aspect a method includes operating a vehicle including an engine that is selectively engageable to a driveline; operating the vehicle in a coasting mode of operation with the driveline disengaged from the engine in response to one or more coasting management conditions being present; and overriding the coasting mode of operation and operating the vehicle in a road speed governor mode of operation with the driveline re-engaged with the engine in response to one or more coasting mode of operation cancellation conditions being present.

Certain embodiments of the method include any one or combination of the following: the one or more coasting mode of operation cancellation conditions includes a speed of the vehicle being less than a first threshold vehicle speed and an accelerator pedal position being greater than a threshold accelerator pedal position; the one or more coasting mode of operation cancellation conditions includes the vehicle speed being less than the first threshold vehicle speed by more than a cancel delta amount; the one or more coasting management conditions includes a speed of the vehicle being greater than a threshold vehicle speed.

According to one aspect an apparatus includes an electronic control unit for a vehicle including an engine that is selectively engageable to a driveline, wherein the electronic control unit is configured to monitor a speed of the vehicle and an accelerator pedal position of the vehicle; determine a road speed governor mode of operation being active in response to the vehicle speed being greater than a vehicle threshold speed and the accelerator pedal position being greater than a threshold accelerator pedal position; and override the road speed governor mode of operation and operate the vehicle in a coasting mode of operation with the driveline disengaged from the engine in response to one or more coasting management conditions being present.

Certain embodiments of the apparatus include any one or combination of the following: the electronic control unit is configured to determine a cruise control mode of operation of the vehicle being disabled before the coasting mode of operation is initiated; the electronic control unit is configured to in response to the vehicle speed being less than a first threshold vehicle speed by more than a cancel delta amount while in the coasting mode of operation, operate the vehicle with the driveline re-engaged to the engine and the coasting mode of operation disabled, the first threshold speed is a coasting management condition and the cancel delta corresponds to a second threshold speed that is less than the first threshold speed; the electronic control unit is configured to determine a torque output of the engine is less than an activation threshold to operate the vehicle in the coasting mode of operation; the electronic control unit is configured to determine an accelerator pedal position is less than a second threshold accelerator pedal position, and re-engaging the driveline to the engine in response to the accelerator pedal being re-engaged to more than the second accelerator pedal threshold; the electronic control unit includes a road speed governor control module configured to control the driveline disengagement for the coasting mode of operation.

According to one aspect an apparatus includes an electronic control unit for a vehicle including an engine that is selectively engageable to a driveline, wherein the electronic control unit is configured to: determine a road speed governor mode of operation of the vehicle being active in response to one or more road speed governor operation conditions being present; disable operation of the vehicle in the road speed governor mode in response to one or more coasting management conditions being present; and operate the vehicle in a coasting mode of operation with the driveline disengaged from the engine.

Certain embodiments of the apparatus include any one or combination of the following: the road speed governor operation conditions include a speed of the vehicle being greater than a vehicle threshold speed and an accelerator pedal position of the vehicle being greater than a threshold accelerator pedal position; the electronic control unit is configured to determine an accelerator pedal position of the vehicle being less than a second threshold accelerator pedal position, and to re-engage the driveline to the engine in response to the accelerator pedal being re-engaged to more than the second accelerator pedal threshold; the electronic control unit is configured to disable operation of the vehicle in the coasting mode of operation in response to one or more coasting mode of operation cancellation conditions and to re-engage the driveline with the engine; the electronic control unit is configured to after the disable operation of the vehicle in the coasting mode of operation, to re-enable operation of the vehicle in the road speed governor mode and re-engaging the driveline with the engine; the one or more coasting mode of operation cancellation conditions include an engine brake being activated and the accelerator pedal position being less than a road speed governor activation accelerator pedal position; the electronic control unit is configured to determine a torque output of the engine is less than an activation threshold to operate the vehicle in the coasting mode of operation.

According to one aspect an apparatus includes an electronic control unit for a vehicle including an engine that is selectively engageable to a driveline, wherein the electronic control unit is configured to: operate the vehicle in a coasting mode of operation with the driveline disengaged from the engine in response to one or more coasting management conditions being present; and override the coasting mode of operation and operating the vehicle in a road speed governor mode of operation with the driveline re-engaged with the engine in response to one or more coasting mode of operation cancellation conditions being present.

Certain embodiments of the apparatus include any one or combination of the following: the one or more coasting mode of operation cancellation conditions includes a speed of the vehicle being less than a first threshold vehicle speed and an accelerator pedal position being greater than a threshold accelerator pedal position; the one or more coasting mode of operation cancellation conditions includes the vehicle speed being less than the first threshold vehicle speed by more than a cancel delta amount; the one or more coasting management conditions includes a speed of the vehicle being greater than a threshold vehicle speed.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

It should be understood that while the use of words such as preferable, preferably, preferred or more preferred if utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
an electronic control unit operatively connected to a vehicle including an engine that is selectively engageable to a driveline, the electronic control unit includes a road speed governor control module, wherein the electronic control unit is configured to:
determine a road speed governor mode of operation of the vehicle being active in response to one or more road speed governor operation conditions being present with the driveline engaged with the engine;
disable operation of the vehicle in the road speed governor mode in response to one or more coasting management conditions being present; and
operate the vehicle in a coasting mode of operation with the driveline disengaged from the engine.

2. The apparatus of claim 1, wherein the road speed governor operation conditions include a speed of the vehicle being greater than a vehicle threshold speed and an accelerator pedal position of the vehicle being greater than a threshold accelerator pedal position.

3. The apparatus of claim 1, wherein the electronic control unit is further configured to determine a torque output of the engine is less than an activation threshold to operate the vehicle in the coasting mode of operation.

4. The apparatus of claim 1, wherein the electronic control unit is further configured to disable operation of the vehicle in the coasting mode of operation in response to one or more coasting mode of operation cancellation conditions and to re-engage the driveline with the engine.

5. The apparatus of claim 4, wherein the electronic control unit is further configured to after the disable operation of the vehicle in the coasting mode of operation, to re-enable operation of the vehicle in the road speed governor mode and re-engaging the driveline with the engine.

6. The apparatus of claim 5, wherein the one or more coasting mode of operation cancellation conditions include an engine brake being activated and the accelerator pedal position being less than a road speed governor activation accelerator pedal position.

7. The apparatus of claim 1, wherein the electronic control unit is further configured to determine an accelerator pedal position of the vehicle being less than a second threshold accelerator pedal position, and to re-engage the driveline to the engine in response to the accelerator pedal being re-engaged to more than the second accelerator pedal threshold.

8. An apparatus comprising:
an electronic control unit operatively connected to a vehicle including an engine that is selectively engageable to a driveline, the electronic control unit includes a road speed governor control module, wherein the electronic control unit is configured to:
monitor a speed of the vehicle and an accelerator pedal position of the vehicle;
determine a road speed governor mode of operation being active in response to the vehicle speed being greater than a vehicle threshold speed and the accelerator pedal position being greater than a threshold accelerator pedal position with the driveline engaged with the engine; and
override the road speed governor mode of operation and operate the vehicle in a coasting mode of operation with the driveline disengaged from the engine in response to one or more coasting management conditions being present.

9. The apparatus of claim 8, wherein the electronic control unit is further configured to determine a cruise control mode of operation of the vehicle being disabled before the coasting mode of operation is initiated.

10. The apparatus of claim 8, wherein the road speed governor control module controls the driveline disengagement for the coasting mode of operation.

11. The apparatus of claim 8, wherein the electronic control unit is further configured to determine a torque output of the engine is less than an activation threshold to operate the vehicle in the coasting mode of operation.

12. The apparatus of claim 8, wherein the electronic control unit is further configured to in response to the vehicle speed being less than a first threshold vehicle speed by more than a cancel delta amount while in the coasting mode of operation, operate the vehicle with the driveline re-engaged to the engine and the coasting mode of operation disabled.

13. The apparatus of claim 12, wherein the first threshold speed is a coasting management condition and the cancel delta corresponds to a second threshold speed that is less than the first threshold speed.

14. The apparatus of claim 8, wherein the electronic control unit is further configured to determine an accelerator pedal position is less than a second threshold accelerator pedal position, and re-engaging the driveline to the engine in response to the accelerator pedal being re-engaged to more than the second accelerator pedal threshold.

15. An apparatus comprising:
an electronic control unit operatively connected to a vehicle including an engine that is selectively engageable to a driveline, the electronic control unit includes a road speed governor control module, wherein the electronic control unit is configured to:
operate the vehicle in a coasting mode of operation with the driveline disengaged from the engine in response to one or more coasting management conditions being present; and
override the coasting mode of operation and operating the vehicle in a road speed governor mode of operation with the driveline re-engaged with the engine in response to one or more coasting mode of operation cancellation conditions being present.

16. The apparatus of claim 15, wherein the one or more coasting mode of operation cancellation conditions includes a speed of the vehicle being less than a first threshold vehicle speed and an accelerator pedal position being greater than a threshold accelerator pedal position.

17. The apparatus of claim 15, wherein the one or more coasting mode of operation cancellation conditions includes the vehicle speed being less than the first threshold vehicle speed by more than a cancel delta amount.

18. The apparatus of claim 15, wherein the one or more coasting management conditions includes a speed of the vehicle being greater than a threshold vehicle speed.

19. A method comprising:
operating a vehicle including an engine that is selectively engageable to a driveline, the vehicle including an electronic control unit having a road speed governor control module;
determining a road speed governor mode of operation of the vehicle being active in response to one or more road speed governor operation conditions being present;
disabling operation of the vehicle in the road speed governor mode in response to one or more coasting management conditions being present; and
operating the vehicle in a coasting mode of operation with the driveline disengaged from the engine.

20. The method of claim 19, wherein the road speed governor operation conditions include a speed of the vehicle being greater than a vehicle threshold speed and an accelerator pedal position of the vehicle being greater than a threshold accelerator pedal position.

21. The method of claim 19, further comprising:
determining a torque output of the engine is less than an activation threshold to operate the vehicle in the coasting mode of operation.

22. The method of claim 19, further comprising:
determining an accelerator pedal position of the vehicle is less than a second threshold accelerator pedal position, and re-engaging the driveline to the engine in response to the accelerator pedal being re-engaged to more than the second accelerator pedal threshold.

23. The method of claim 19, wherein one or more coasting mode of operation cancellation conditions include an engine brake being activated and the accelerator pedal position being less than a road speed governor activation accelerator pedal position.

24. The method of claim 19, further comprising:
disabling operation of the vehicle in the coasting mode of operation in response to the one or more coasting mode of operation cancellation conditions and re-engaging the driveline with the engine.

25. The method of claim 24, further comprising:
after disabling operation of the vehicle in the coasting mode of operation, re-enabling operation of the vehicle in the road speed governor mode and re-engaging the driveline with the engine.

26. A method comprising:
operating a vehicle including an engine that is selectively engageable to a driveline, the vehicle including an electronic control unit having a road speed governor control module;
monitoring a speed of the vehicle and an accelerator pedal position of the vehicle; and
determining a road speed governor mode of operation being active in response to the vehicle speed being greater than a vehicle threshold speed and the accelerator pedal position being greater than a threshold accelerator pedal position with the driveline engaged with the engine; and
overriding the road speed governor mode of operation and operating the vehicle in a coasting mode of operation with the driveline disengaged from the engine in response to one or more coasting management conditions being present.

27. The method of claim 26, further comprising:
a cruise control mode of operation of the vehicle being disabled before the coasting mode of operation is initiated.

28. The method of claim 26, further comprising:
determining a torque output of the engine is less than an activation threshold to operate the vehicle in the coasting mode of operation.

29. The method of claim 26, wherein in response to the vehicle speed being less than a first threshold vehicle speed by more than a cancel delta amount while in the coasting mode of operation, operating the vehicle with the driveline re-engaged to the engine and the coasting mode of operation disabled.

30. The method of claim 29, wherein the first threshold speed is a coasting management condition and the cancel delta corresponds to a second threshold speed that is less than the first threshold speed.

31. The method of claim 26, further comprising:
determining an accelerator pedal position is less than a second threshold accelerator pedal position, and re-engaging the driveline to the engine in response to the accelerator pedal being re-engaged to more than the second accelerator pedal threshold.

32. The method of claim 26, wherein the threshold accelerator position is at least 75% of a fully depressed accelerator pedal position.

33. The method of claim 26, wherein the driveline disengagement for the coasting mode of operation is controlled with the road speed governor control module.

34. A method comprising:
operating a vehicle including an engine that is selectively engageable to a driveline, the vehicle including an electronic control unit having a road speed governor control module;
operating the vehicle in a coasting mode of operation with the driveline disengaged from the engine in response to one or more coasting management conditions being present; and
overriding the coasting mode of operation and operating the vehicle in a road speed governor mode of operation with the driveline re-engaged with the engine in response to one or more coasting mode of operation cancellation conditions being present.

35. The method of claim 34, wherein the one or more coasting mode of operation cancellation conditions includes a speed of the vehicle being less than a first threshold vehicle speed and an accelerator pedal position being greater than a threshold accelerator pedal position.

36. The method of claim 35, wherein the one or more coasting mode of operation cancellation conditions includes the vehicle speed being less than the first threshold vehicle speed by more than a cancel delta amount.

37. The method of claim 34, wherein the one or more coasting management conditions includes a speed of the vehicle being greater than a threshold vehicle speed.

* * * * *